US008582552B2

(12) United States Patent
Proctor, Jr. et al.

(10) Patent No.: US 8,582,552 B2
(45) Date of Patent: *Nov. 12, 2013

(54) MAINTAINING A MAINTENANCE CHANNEL IN A REVERSE LINK OF A WIRELESS COMMUNICATIONS SYSTEM

(75) Inventors: James A. Proctor, Jr., Melbourne Beach, FL (US); George Rodney Nelson, Jr., Merritt Island, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,093

(22) Filed: Feb. 6, 2012
(Under 37 CFR 1.47)

(65) Prior Publication Data
US 2012/0134341 A1 May 31, 2012

Related U.S. Application Data

(63) Continuation of application No. 10/339,183, filed on Jan. 8, 2003.

(60) Provisional application No. 60/346,525, filed on Jan. 8, 2002, provisional application No. 60/346,527, filed on Jan. 8, 2002, provisional application No. 60/346,511, filed on Jan. 8, 2002.

(51) Int. Cl.
*H04B 7/204* (2006.01)
*H04B 7/212* (2006.01)
*H04B 7/216* (2006.01)

(52) U.S. Cl.
USPC ............ 370/348; 370/329; 370/342; 455/515

(58) Field of Classification Search
USPC .......... 455/517, 522; 370/335–337, 342, 345, 370/347–350
See application file for complete search history.

(56) References Cited

U.S. PATENT DOCUMENTS 5,081,704 A * 1/1992 Umeda et al. ................. 455/450
5,267,244 A * 11/1993 Messerschmitt et al. ..... 370/342
(Continued)

FOREIGN PATENT DOCUMENTS

JP S63-316942 12/1988
JP H03-104428 5/1991
(Continued)

OTHER PUBLICATIONS

Dean et al., "Toward a North American Standard for Mobile Data Services," Digital Signal Processing, Academic Press, vol. 2, No. 1 (Jan. 1992).

(Continued)

*Primary Examiner* — Matthew Sams
(74) *Attorney, Agent, or Firm* — Volpe and Koenig, P.C.

(57) ABSTRACT

In a reverse link of a wireless CDMA communication system, a method of maintaining an idling mode connection between a field unit and a base transceiver station is provided using various techniques to maintain the idle mode connection at a reduced power level. A preferred embodiment computes a time slot or frame offset based on modulo function using a field unit identifier in order to distribute field unit maintenance transmissions among available slots or offsets. An alternate embodiment detects explicit signaling states changes at the physical layer and causes power target changes. A further embodiment transmits maintenance data during predetermined time intervals, coordinated between the field units and BTS, allowing power levels to be adjusted accordingly.

16 Claims, 11 Drawing Sheets

(56) References Cited

U.S. PATENT DOCUMENTS

| | | | |
|---|---|---|---|
| 5,418,813 A | 5/1995 | Schaffner et al. | |
| 5,436,904 A * | 7/1995 | Pequet et al. | 370/347 |
| 5,440,541 A | 8/1995 | Iida et al. | |
| 5,940,765 A | 8/1999 | Haartsen | |
| 6,091,719 A | 7/2000 | Kondo et al. | |
| 6,157,628 A | 12/2000 | Uebayashi et al. | |
| 6,201,966 B1 | 3/2001 | Rinne et al. | |
| 6,222,832 B1 * | 4/2001 | Proctor | 370/335 |
| 6,356,763 B1 | 3/2002 | Kangas et al. | |
| 6,393,013 B1 * | 5/2002 | Masui et al. | 370/346 |
| 6,452,913 B1 | 9/2002 | Proctor, Jr. | |
| 6,466,800 B1 | 10/2002 | Sydon et al. | |
| 6,545,996 B1 | 4/2003 | Falco et al. | |
| 6,807,160 B1 * | 10/2004 | Laroia et al. | 370/329 |
| 6,954,448 B2 * | 10/2005 | Farley et al. | 370/337 |
| 7,054,286 B2 * | 5/2006 | Ertel et al. | 370/329 |
| 7,130,283 B2 * | 10/2006 | Vogel et al. | 370/322 |
| 2001/0033558 A1 | 10/2001 | Matsuki | |
| 2002/0009129 A1 | 1/2002 | Choi et al. | |
| 2003/0027587 A1 | 2/2003 | Proctor, Jr. | |
| 2003/0040315 A1 | 2/2003 | Khaleghi et al. | |
| 2004/0047328 A1 * | 3/2004 | Proctor et al. | 370/342 |
| 2004/0095907 A1 | 5/2004 | Agee et al. | |

FOREIGN PATENT DOCUMENTS

| | | |
|---|---|---|
| JP | H11-041203 | 2/1999 |
| WO | 01/58043 | 8/2001 |
| WO | 02/101941 | 12/2002 |

OTHER PUBLICATIONS

Arib TR-T13-S.R0003-A, System Capability Guide, Release B, 3GPP2 S.R0003-A, Version 1 (Jun. 14, 2001).

Celeritek, "824 to 849 MHz 28.0 dBm, Cellular InGaP HBT Amplifier Module," Advanced Product Information, CHP0205-QM (Jul. 2002).

Kelly, "Basics of Signal Processing," MEIT-2002, Section 5, pp. 1-16 (Mar. 2002).

Raitola, "CDMA Overview," S-38.220, Licentiate Course on Signal Processing in Communications, Fall-97 (Sep. 10, 1997).

TIA/EIA Interim Standard, Physical Layer Standard for cdma2000 Spread Spectrum Systems Addendum 1, TIA/EIA/IS-2000.2-A-1 (Nov. 2000).

* cited by examiner

MAINTAINING A MAINTENANCE CHANNEL IN A REVERSE LINK OF A WIRELESS COMMUNICATIONS SYSTEM

CROSS REFERENCE TO RELATED APPLICATIONS

This application is a continuation of U.S. patent application Ser. No. 10/339,183, filed Jan. 8, 2003, which claims the benefit of U.S. Provisional Application No. 60/346,525, filed Jan. 8, 2002, U.S. Provisional Application No. 60/346,527, filed Jan. 8, 2002 and U.S. Provisional Application No. 60/346,511, filed Jan. 8, 2002. The entire teachings of the above applications are incorporated herein by reference.

BACKGROUND OF THE INVENTION

In a point to multi-point wireless communication system, a number of radio channels provide a connection between remote (mobile) access or field units and a central location, such as a base station or access point. In a Code Division Multiple Access (CDMA) system, a number of different channels can be transmitted on a single radio frequency carrier by applying different codes to each signal. However, even in a CDMA system, demand for access to channels is so great that the base station must allocate and switch the channels among multiple users.

CDMA type multiple access schemes are generally thought to, in theory, provide the most efficient use of the radio spectrum. CDMA schemes only work well, however, when the power levels and transmit times of individual transmissions are carefully controlled. The original widely deployed CDMA voice wireless systems such as IS 95B use two different types of power control on the uplink in order to ensure that a signal from a given field unit arriving at the base station does not interfere in a disruptive manner with the signals arriving from other field units. In a first process, referred to as open loop power control, a rough estimate of the proper power control level is established by the mobile field unit itself. In particular, after a call is established and as the mobile moves around within a cell, the path loss between the field unit and the base station will continue to change. The mobile continues to monitor the receive power and adjust its transmit power. The mobile measures a power level on the forward link signal as received from the base station and then sets its reverse link power accordingly. Thus, for example, if the receive power level is relatively weak, then the mobile assumes that it is relatively distant from the base station and increases its power level. The converse is true, in that a signal received at a relatively high level indicates that the mobile is relatively close to the base station and therefore should be transmitting with reduced power.

Since the forward and reverse links are on different frequencies, however, open loop power control is inadequate and too slow to compensate for fast Rayleigh fading. In other words, since Rayleigh fading is frequency dependent, open loop power control alone cannot compensate for it completely in CDMA systems. As a result, closed loop power control is also used to compensate for power fluctuations. In the closed loop process, once the remote unit obtains access to a traffic channel and begins to communicate with the base station, the base station continuously monitors the received power level on the reverse link. If the link quality begins deteriorating, the base station sends a command to the mobile via the forward link to increase its power level. If the link quality indicates excess power on the reverse link, the base station commands the mobile unit to power down. This is typically done by having the base station send power control commands to the mobile using a specially encoded message sent on a forward link traffic channel.

Unlike voice traffic, the user of a wireless data service may be switched on, but not actively sending or receiving data. Accordingly, wireless data users may be in an "active" mode (currently allocated a wireless data traffic channel for sending or receiving data), an "idle" mode (operational, but not currently sending or receiving data) or "off" (not communicating at all). An idle user may, for example, have just sent or received a data traffic transmission and is therefore deemed likely to soon request a data traffic channel for further transmissions. A maintenance message may therefore be employed to maintain a user in a synchronized, but idle, state to facilitate allocation of a wireless traffic channel when needed. When a user requests a channel, the idle state allows the user to be allocated a wireless traffic channel more quickly than for a user who was not being maintained in a synchronized idle state. For more information concerning one way to implement a system for quickly switching states, please refer to U.S. Pat. No. 6,222,832, entitled "Fast Acquisition of Traffic Channels for a Highly Variable Data Rate Reverse Link of a CDMA Wireless Communication System@ assigned to Tantivy Communications, Inc., assignee of the present application.

A number of users, therefore, may be maintained in an idle state through a periodic sequence of maintenance messages. In the idle state, the maintenance messages typically provide time tracking and power control. These maintenance messages, however, are typically sent at a similar power level during both the idle and active states so that the base station can be assured of receiving them. Unfortunately, the maintenance messages can increase interference with other active units since they are still transmitting energy.

SUMMARY OF THE INVENTION

A wireless system as disclosed herein employs a reverse link maintenance channel for maintaining synchronization and other state information for a number of simultaneously active field (remote or access) units. The field access units provide a data service to users via a wireless link to a base station for communication with other nodes of a data network, such as the Internet. The wireless link is provided by one or more wireless channels managed by the base station. The wireless channels are dynamically allocated by the base station among the multiple access terminals depending on data transmission needs, and typically do not remain dedicated to a single user.

In a preferred embodiment, a separate maintenance channel connection is maintained for transmission of synchronization messages. The maintenance channel typically transmits un-modulated, or pilot, signals for maintaining synchronization. Since the maintenance channel is not a dedicated data traffic channel, a plurality of access terminals may be maintained over a single maintenance channel using a plurality of time slots, gating periods and/or frame offsets.

The synchronization messages are typically sent at predetermined intervals from each of the access terminals. In one preferred embodiment, in the idle state, synchronization messages are sent according to a gating rate. In the active state, synchronization messages are sent continuously in order to maintain a phase reference for a corresponding data traffic transmission. Return power control messages are sent in response to the synchronization messages including power control and time tracking information according to a power control target. The target power level can be determined by the base station using factors including the received signal strength, received signal quality, Carrier-to-Interference (C/I) ratio, and the Signal to Noise Ratio (SNR).

More specifically, the maintenance channel is employed to maintain an access terminal in synchronization with the base station when it is not actively sending data. Such a maintenance channel is capable of maintaining a plurality of access terminals at the same time. This synchronization allows an access terminal to be allocated a data traffic channel more readily when needed for data traffic transmission than that which would be required to set up and tear down a reverse link wireless channel each time the access terminal was to send or receive data messages.

In accordance with one aspect of the invention, the maintenance channel is shared by multiple access units through time multiplexing. Specifically, a method of maintaining an idling mode connection between a remote (mobile) or so-called field or subscriber unit (SU) and a Base Transceiver Station (BTS) includes determining an identifier (e.g., MAC_ID) corresponding to a particular SU. The identifier is unique and deterministic to that SU. A modulo function is applied to the identifier and the result is employed in computing a frame offset or definition of which time periods are gated on and which are gated off (a slot) to ensure a time division multiplexed (TDM) nature between users of the shared channel. The identifier, therefore, is effectively employed in a hash operation to ensure optimal distribution of available free time slots (or frame offsets) among multiple users.

Accordingly, this invention provides a method to implicitly assign users to specific TDM slots, and/or frame offsets in a reverse link of a communications system to allow for a reduction in interference.

In accordance with another aspect of the invention, a method of maintaining an idling mode connection between a field unit and a Base Transceiver Station (BTS) includes determining a reverse link state change need between a plurality of states including active, idle (e.g., control hold gated and control hold non-gated), and off (e.g., dormant). An indication for a request for a state change is transmitted at the physical layer. A physical layer indication is detected, and upon changing state from a non payload or signaling bearing state to a payload or signal bearing state, the power control targets in the BTS are changed.

By changing power control targets and levels in this manner, interference is reduced, since not only do fewer field units transmit pilot or other maintenance overhead information simultaneously, but also that information is transmitted at a lower power level.

In accordance with other aspects of the invention, a reverse link of a wireless CDMA communication system uses a method of maintaining an idling mode connection between a field unit and a BTS station. The method includes determining a predetermined interval indicative of transmission of maintenance data. More specifically, the BTS and a field unit are coordinated, via a maintenance message or other means, such that the predetermined interval is common and known to both. A transmission power level is adjusted at regular cycles according to the predetermined interval, and a maintenance message is transmitted, at the adjusted power level, to the BTS. The message is received, at the BTS, and a reference power control target, indicative of a signal quality level, is adjusted at the BTS in response to the adjusted power level. Successive exchanges then occur at each subsequent periodic interval. This provides for higher reliability reception of the maintenance data at the BTS while still allowing lower transmit power for the maintenance channel when no data is being transmitted.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

A description of preferred embodiments of the invention follows.

Figure 1:
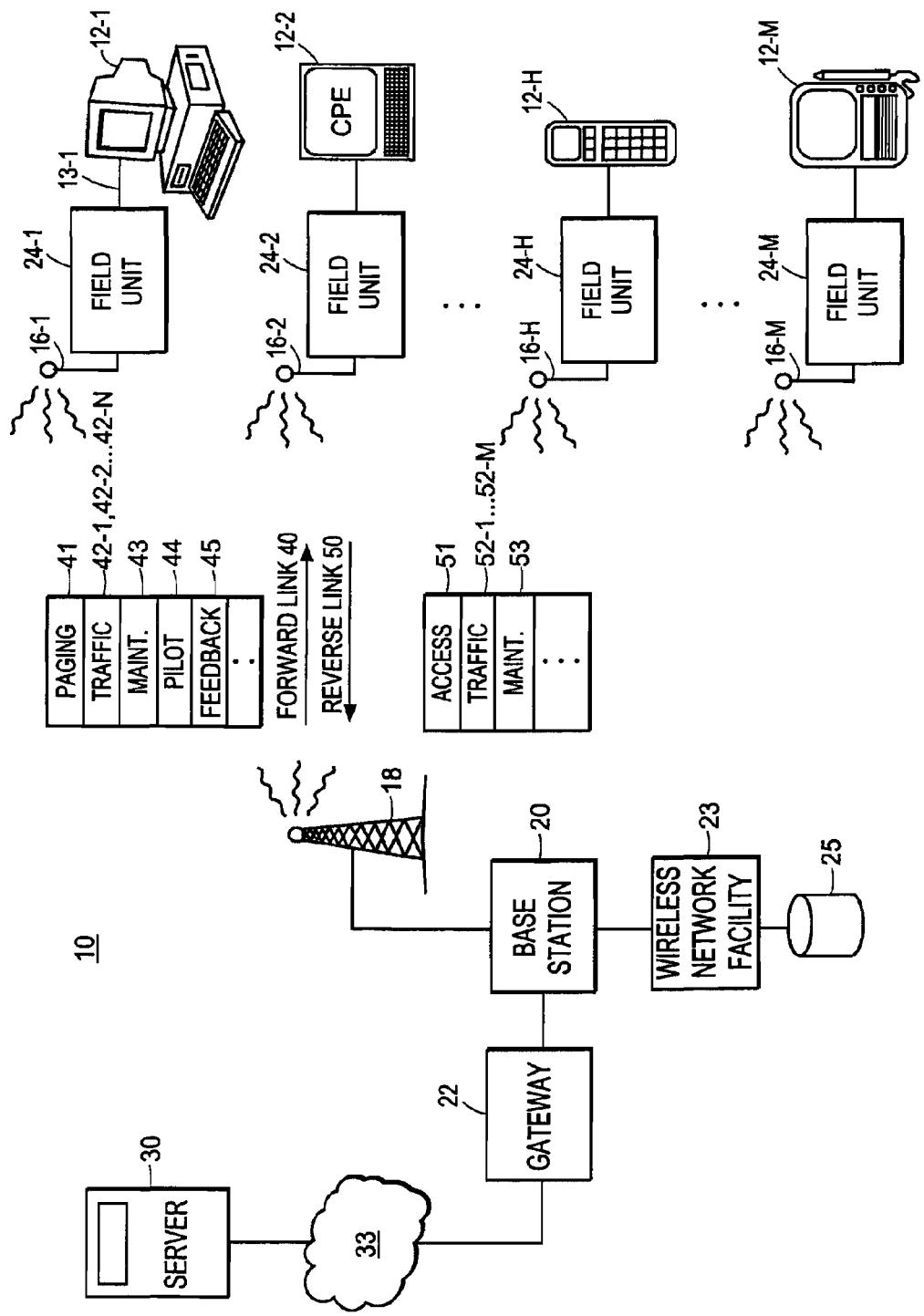
FIG. 1 is a diagram of a wireless communication system employing the invention as defined by the present claims.

FIG. 1 is a block diagram illustrating a wireless communication system supporting the transmission of data information over multiple allocated communication channels according to certain aspects of the present invention. As in many wireless communication systems, users compete for wireless bandwidth allocation. Hence, it is desirable that the wireless communication 10 is optimized for data throughput and, in certain applications, high speed bursts of data throughput.

Certain aspects of the present invention are based on the recognition that the power output of a field unit transmitting over a wireless channel can be controlled so that it minimally interferes with other field units using the same general wireless airspace. In particular, a power output level of a transmitting field unit is set as low as possible so that it does not interfere with other field units attempting to communicate with the same base station.

As shown, communication system 10 includes a number of devices that are capable of data communication such as Personal Computer (PC) devices 121, or other types of customer premises equipment (CPE) 32 generally, such as portable PCs 12-2, handheld data enabled wireless phones 12-H, personal digital assistants (PDAs) 12-M, and other devices such as pagers, automotive telematics devices, and the like not shown (collectively referred to herein as the PCs). It should be noted that the PC devices 122, . . . 12h, . . . 12m, each connect to at least one corresponding field unit or access terminals 241, 242, . . . 24h, . . . 24m, and associated directional antenna devices 161, 162, . . . 16*h*, . . . 16*m*. Although the term "field unit" is used herein principally, it should be understood that other terms such as "subscriber unit", "access unit", "mobile device", etc., can be used to refer to the same equipment by other authors.

Centrally located equipment includes a base station antenna 18, and a corresponding base station (also referred to herein as a Base Transceiver Station (BTS) 20 that includes radio transceivers and high speed control and processing capability.

Base station 20 and related infrastructure provides connections to and from a network gateway 22, network 33 such as the Internet, and network file server 30. Communication system 10 is preferably a demand access, point to multi point wireless communication system such that the PC devices 12 can transmit data to and receive data from network server 30 based on a logical connection including bi directional wireless connections implemented over forward links 40 and reverse links 50. That is, in the point to multi point multiple access wireless communication system 10 as shown, a given base station 20 typically supports communication with a number of different field units 24 in a manner which is similar to a cellular telephone communication network. Accordingly, system 10 can provide a framework for a CDMA wireless communication system where digital information is relayed on demand between multiple mobile cellular users and a hardwired network 33 such as the Internet.

One or multiple PC devices 12 are each connected to a respective field unit 24 through a suitable hard wired connection such as an Ethernet type connection via cable 13.

Each field unit 24 permits its associated PC device 12 access to network file server 30 using the wireless communication system. In the reverse link 50 direction, that is, for data traffic transmitted from the PCs 12 towards the server 30, the PC device 12 transmits information to a field unit 24 based on, for example, an Internet Protocol (IP) level network packets. The field unit 24 then encapsulates the wired framing, i.e., Ethernet framing, with appropriate wireless connection framing so that data packets can be transmitted over the wireless link of communication system 10. Based on a selected wireless protocol, the appropriately formatted wireless data packet then travels over one of the radio channels that comprise the reverse link 50 through field unit antenna 16 to base station antenna 18. At the central base station location, the base station 20 then extracts the radio link framed data packets and reformats the packets into an IP format. The packets are then routed through gateway 22 and any number or type of networks 33 to an ultimate destination such as a network file server 30.

In one application, information generated by PC device 12 is based on a TCP/IP protocol. Consequently, a PC device 12 has access to digital information such as web pages available on the Internet. It should be noted that other types of digital information can be transmitted over channels of communication system 10 based on the principles of the present invention. Examples of other types of digital information would be data sent using Universal Datagram Protocol (UDP) such as video and audio streams etc.

Data information can also be transferred from the network file server 30 to PCs 12 on forward link 40. In this instance, network data such as IP (Internet Protocol) packets originating at file server 30 travel on network 33 through gateway 22 to eventually arrive at base station 20. As previously discussed for reverse link data transmissions, appropriate wireless protocol framing is then added to raw data such as IP packets for communication of the packets over wireless forward link 40. The newly framed packets then travel via an RF signal through base station antenna 18 and field unit antenna 16 to the intended target field unit 24. An appropriate target field unit 24 decodes the wireless packet protocol layer, and forwards the packet or data packets to the intended PC device 12 that performs further processing such as IP layer processing. A given PC device 12 and file server 30 can therefore be viewed as the end points of a logical connection at the IP level. Once a connection is established between the base station processor 20 and corresponding field unit 24, a user at the PC device 12 can then transmit data to and receive data from file server 30 on an as needed basis.

Reverse link 50 includes different types of logical and/or physical radio channels such as an access channel 51, multiple traffic channels 521, . . . 52*m*, and maintenance channels 53. The reverse link access channel 51 is typically used by the field units 24 to request connection to a base station 20 and an allocation of traffic channels by the base station 20. For example, traffic channels 52 can be assigned to users on an as needed basis. The assigned traffic channels 52 in the reverse link 50 then carry payload data from field unit 24 to base station 20.

Notably, a given link between base station 20 and field unit 24 can have more than one traffic channel 52 assigned to it at a given instant in time. This enables the transfer of information at higher rates.

Maintenance channels 53 can be used to carry information such as synchronization, power control, channel quality reporting, and channel requests to further support transmission of digital information over both reverse link 50 and forward link 40.

Forward link 40 can include a paging channel 41, which is used by base station 20 to inform a field unit 24 of general information such as signaling one or multiple forward link traffic channels 42 have been allocated to it for forward link data transmissions. Traffic channels 421 . . . 42*n* on the forward link 40 are used to carry payload information from base station 20 to a corresponding target field unit 24.

Maintenance channel 43 can be used to transmit synchronization and power control information on forward link 40 from base station processor 20 to field units 24. Additionally, paging channel 41 can be used to inform a field unit 24 of allocated traffic channels 52 in the reverse link 50 direction.

Traffic channels 42 of the forward link 40 can be shared among multiple field units 24 based on a Time Division Multiplexing scheme. Specifically, a forward link traffic channel 42 is optionally partitioned into a predetermined number of periodically repeating time slots for transmission of data packets from the base station 20 to multiple field units 24. It should be understood that a given field unit 24 can, at any instant in time, have multiple time slots or no time slots assigned to it for use.

Thus field units 24 can transmit messages of various types to the base station 20 over a channel such as access channel 51. Access channel 51 thus needs to support transmission of access request messages from a field unit 24 to base station 20. An access request message can indicate a request by field unit 24 that it needs a base station connection, of if it already is connected that it has data ready to send, and that it now needs access to a high speed bi directional communication link, for example.

Feedback channel 45 is provided so that base station 20 can send feedback messages to field units 24. At least a portion of the feedback channel 45 as shown is reserved for transmitting general messages to the collective field units 24 as broadcast messages. These messages can include overhead, call setup, radio channel assignment, transmission code assignments, and a host of other information needed by the field units 24 in order to communicate with the base station 20.

It should be noted that one type of such messages can also be used to control the operating transmit power level of the field units 24. In this instance, a field unit 24 can adjust its power output level for a subsequent message transmission based on feedback information received from base station 20. More specifically, a field unit 24 can adjust its target power output level depending on a feedback message received on feedback channel 45 or paging channel 41 respectively. Accordingly, the power output level of a field unit 24 can be optimized so that it minimally interferes with other field units 24 transmitting information over a common radio frequency.

It should be noted that the field units 20 are controlled to be in one of several major operating states, including at least an active mode and an idle mode. Thus, each of the access terminals 24, even when in an idle mode, must periodically send a synchronization message via the maintenance channel 53 on the reverse link 50 to the base station 20. The synchronization message allows for the determination of time tracking and power control information sufficient to maintain the access terminal in at least an idle state, and therefore synchronized with the base station 20.

In one wireless communication standard promulgated by the Telecommunications Industry Association (TIA) known as "CDMA2000", power control measurements are made at the BTS 20, compared to a threshold, then an "up/down" power control signal is sent to the field unit 24. In other proposed systems, such as the InternetCDMA ("I-CDMA") system proposed by the Third Generation Partnership Project 2 (3GPP2), measurements are made at the BTS 20, sent to the field unit 24, and then the field unit 24 makes power level adjustment decisions.

The base station responds with a power control message via the forward link 40. The power control message includes power control commands or power control measurements to direct the power level of subsequent messages to allow the access terminal 24 to remain synchronized with the base station 20. The power level is determined by a power level control function implemented either in a data or signal processor located at the base station 20 or the field unit 24 for computing a target power level for both the idle and active data transmission states.

It should be noted that the field units 20 are controlled to be in one of several major operating states. More particularly, the present invention efficiently provides a relatively large number of virtual physical connections between the subscriber units and the base stations on the reverse link for extended idle periods such as when computers connected to the subscriber units are powered on, but not presently actively sending or receiving data. This is accomplished by send other types of control messages that permit the base station 20 and the field units 24 to remain in phase and time synchronism.

In a so-called idle mode, the subscriber unit sends a synchronization "heartbeat" signal, a pilot signal or a message on the reverse link maintenance 53 channel at a data rate which need only be fast enough to allow the subscriber unit to maintain synchronization with the base station. The duration of this signal is determined by considering several factors, including the capture or locking range of the code phase locking circuits in the receiver at the base station, by the power control rate that is required, and/or by the rate at which the request indication needs to be sent, based on a maximum delay for which a channel may still be requested.

The forward 40 and reverse 50 links further comprise data traffic channels for use in transmitting wireless messages when the field unit 24 is in an active mode. The data traffic channels are allocated by the base station 20 to an access terminal 24 when the access terminal 24 is to send or receive data. A data transmission state, described further below, is indicative of whether the access terminal 24 is allocated a data traffic channel. When the data transmission state is active, the synchronization messages or signals provide a phase reference for the messages transmitted on the data traffic channels, in addition to time tracking and power control.

Synchronization messages or signals employed only for time tracking synchronization and power control, however, do not require as much power as the synchronization messages or signals used to provide phase reference during the active data transmission state. Therefore, synchronization messages or signals can be sent at a reduced power level in the idle data transmission state. Additional power is provided for the synchronization message or signal when it is also employed for phase reference.

Figure 2:
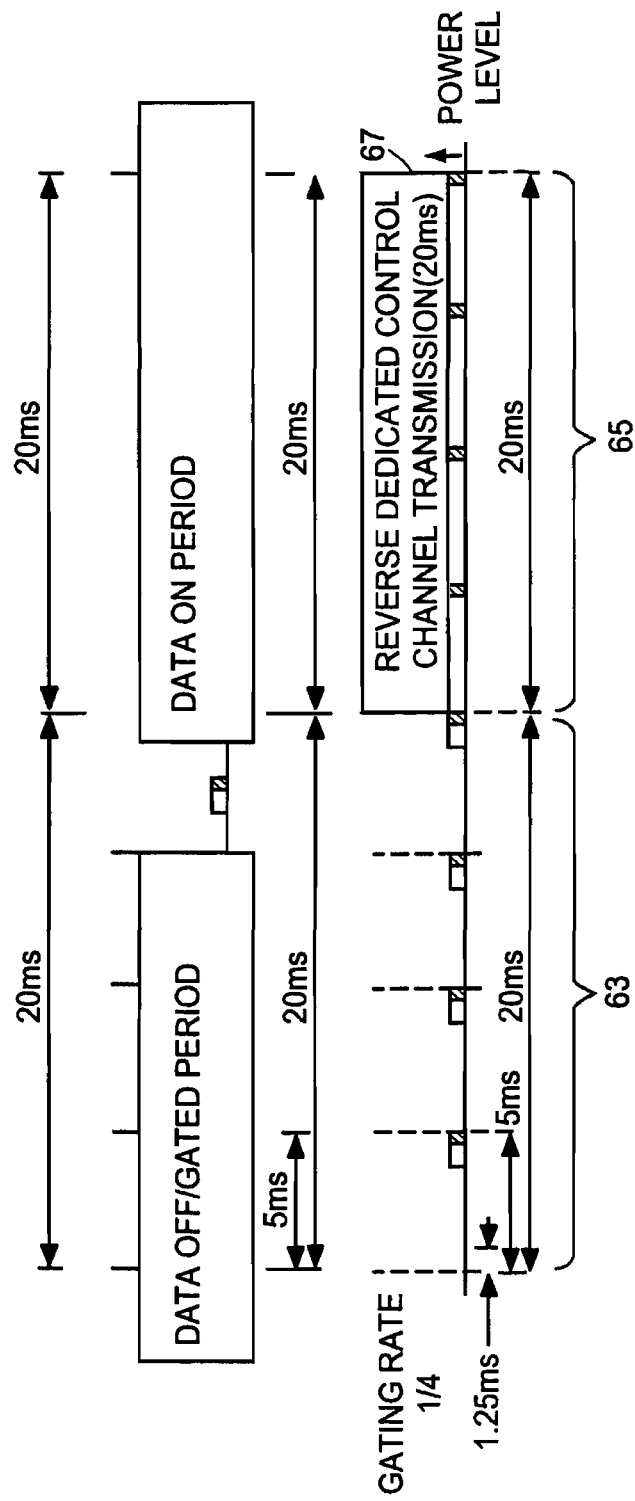
FIG. 2 is a diagram of wireless synchronization messages.

Accordingly, the synchronization messages are sent at a lower power level in the idle data transmission state than in the active data transmission state. FIG. 2 is a diagram that illustrates one possible implementation for how the maintenance channel 53 is used to send synchronization messages and/or signals. In this embodiment, during an idle (data-off) data transmission state 63, the synchronization messages and/or signals are sent in a gated manner according to a gating rate. A gating rate of ¼ is shown as exemplary; other gating rates could be employed. In the active (data-on) transmission state 65, the synchronization messages and/or signals are sent continuously. This type of control over the gating period is used in systems such as CDMA2000.

Figure 3:
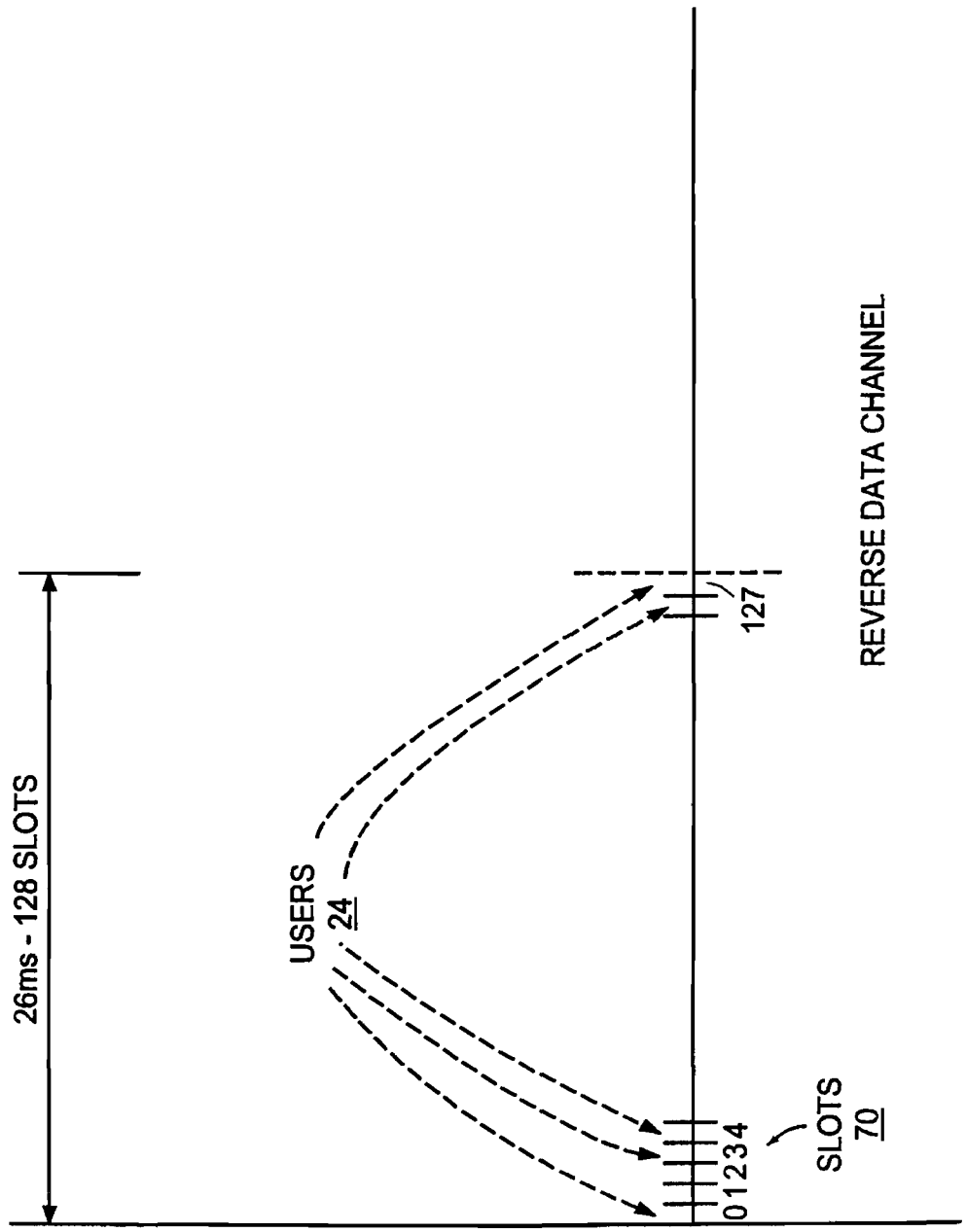
FIG. 3 is a diagram of a time slotted reverse data channel.

In certain other preferred embodiments of the invention, the maintenance channel 53 is divided into time slots, so that it can be shared among multiple users. FIG. 3 is a diagram of a function for distributing the synchronization signals into time slots in this fashion. The diagram illustrates one such time slotted reverse channel; this is the scheme used in the I CDMA system. Here, a 26 ms data frame is divided into one hundred and twenty eight (128) slots 70, with each slot being uniquely assigned one of up to 128 field units 24.

Figure 4:
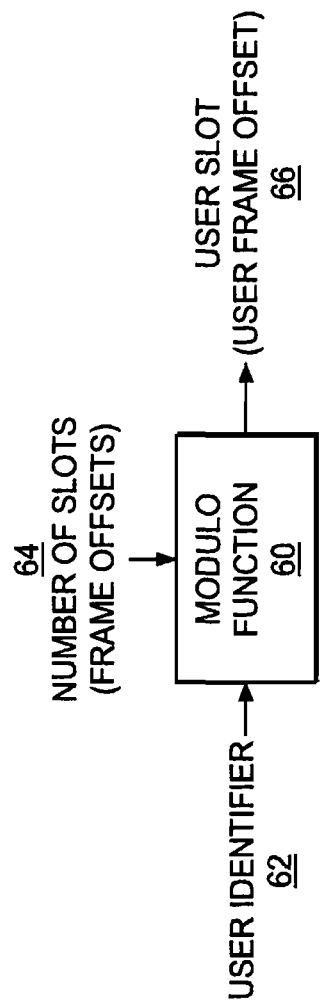
FIG. 4 is a diagram of a function for distributing users into slots.

In this embodiment, a computation is made to determine which user is assigned to which time slot. Specifically, as shown in FIG. 4, a user identifier 62 and a number of slots 64 is input into a modulo function 60 to determine a user slot 66 number. The resultant user slot 66 is then used to distribute field units (users) 24 among available time slots and/or frame offsets. The same modulo function is used by both the base station 20 and the field units 24 so that they remain properly coordinated. The computed user slot 66 is used to match a given field unit 24 to a specific time slot 70 on the reverse maintenance channel.

The user identifier 62 may relate to a unit serial number, or some other number such as a Media Access Control layer identifier (MAC_ID). As long as all the user identifiers 62 are different, the users will be equally distributed among the available time slots, which in turn will reduce interference.

In a system such as I-CDMA, where users are sharing a common channel code, care must be taken however to ensure that multiple different users 24 are not allowed to be mapped to the same time slot 70. It is typically necessary, therefore, to assign ordinal numbers to the field units at the time they enter the idle mode.

In other systems, such as CDMA 2000, it is possible for the field units 20 to transmit on different coded channels at the same time. Here, it is more likely that a larger, more "random" number, such as a MAC_ID, can be used to determine the time slot 70.

Figure 5:
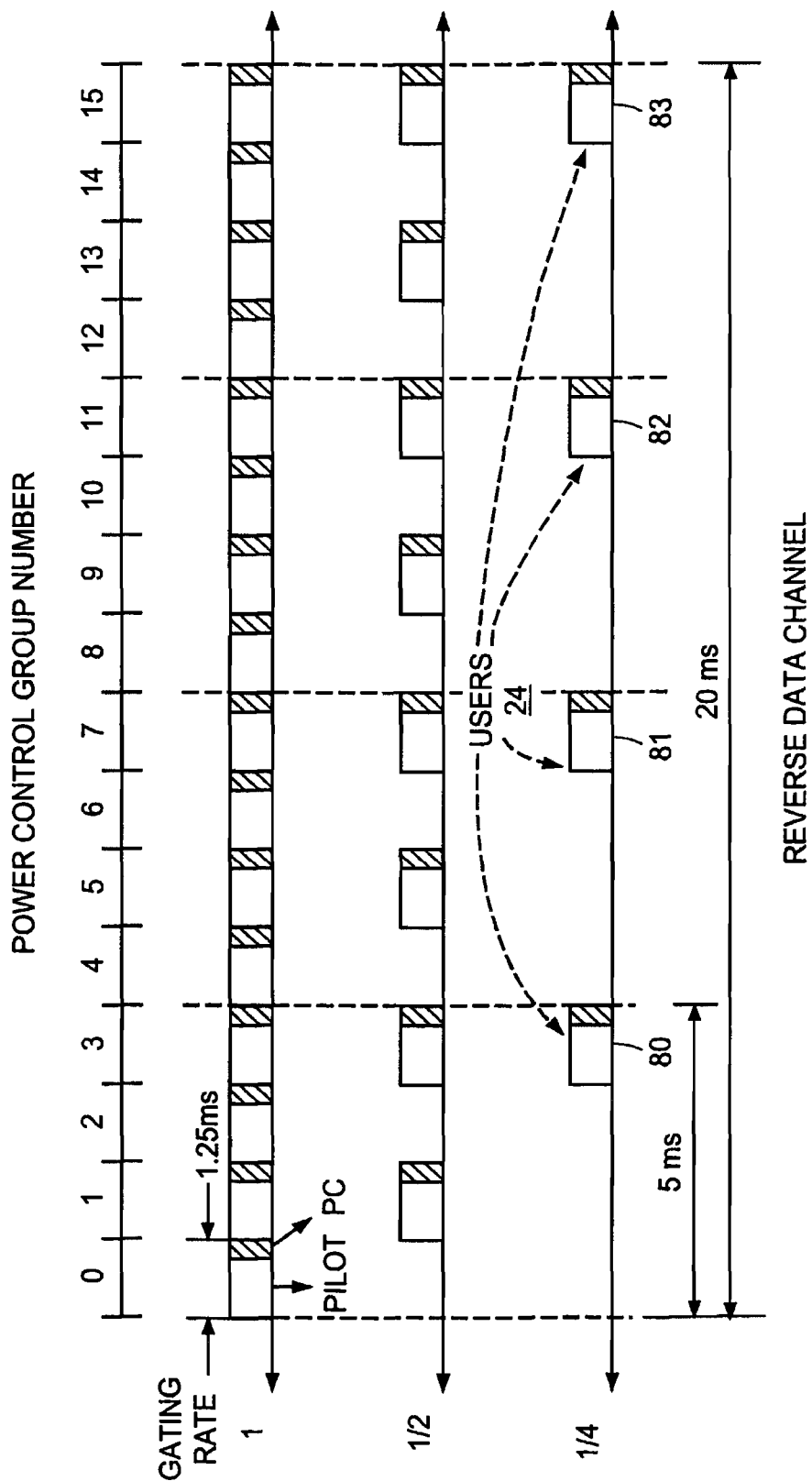
FIG. 5 is a diagram of a gated reverse data channel.

FIG. 5 is a more detailed diagram of a gated reverse link channel, such as might be used with a CDMA2000 system. In CDMA2000, the field units 24 are distributed to gated on periods 80-83 in order to evenly distribute signal traffic. Because CDMA2000 differentiates users 24 based on long code offsets, having multiple users 24 assigned to the same gated on slots 80-83 does not present a problem. The receiver at the base station 20 can still discriminate different users by detecting their long codes. When such a communications system 22 (e.g., CDMA2000) employs gated reverse data channels each field unit 24 is thus also allowed to have a different gated rate.

Figure 6:
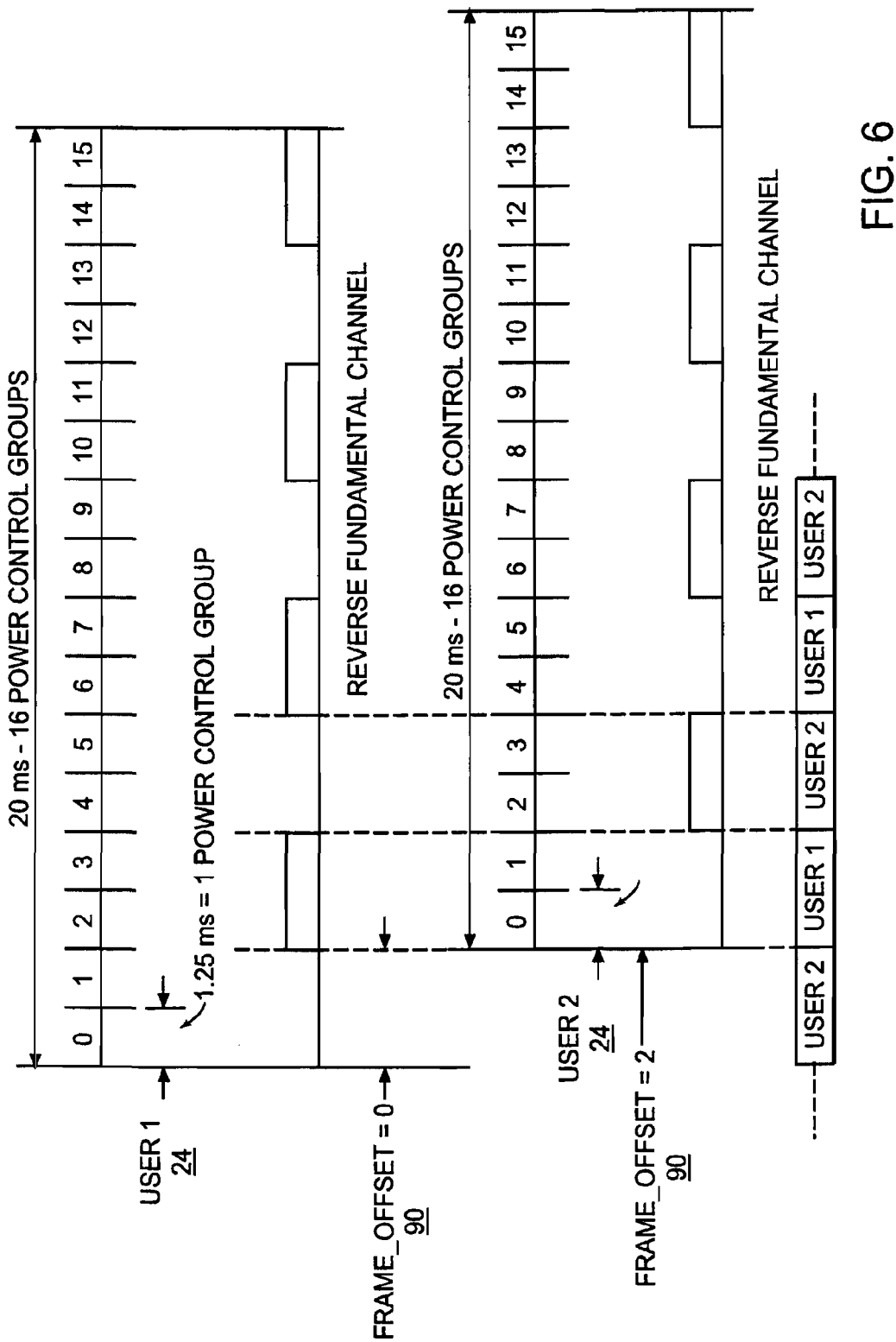
FIG. 6 is a diagram of a frame offset reverse data channel.

Here, the modulo user slot number 66 produced by the modulo function 60 is used to assign one of the gated periods to a particular user. So, for example, if there are four possible gated-on periods 80-83, each has a corresponding modulus 0, 1, 2, or 3 to which any MAC_ID or other identifier will map to a particular one of the offset periods 80-83. In this fashion, field units 24 will be allocated to gated on periods in a more or less uniform fashion. FIG. 6 illustrates this concept in more detail. In a communications system 22 employing a frame offset reverse data channel the computed user slot 66 is used to determine a frame offset 90. For example, user 1 may be assigned a frame offset 90=0, while a user 2 may be assigned a frame offset=2. The different frame offsets allow for reduced interference while communicating within communications system 22.

In one preferred embodiment maintenance channel 53 data for multiple users is spread across multiple frame offsets 90, thereby allowing the maintenance signal data to be sent at a reduced power level. In other embodiments, such as for gated traffic channels, a similar scheme can be used to advantage.

As indicated above briefly, synchronization messages are preferably transmitted at controlled power levels. The power level is managed by the base station 20 and transmitted to the access terminal 24 via the power control messages. The access terminal 24 responds by transmitting at the power level proscribed by the base station. The base station 20 computes a target power level, described further below, indicative of the power level at which the access terminal should transmit. Typically, the power level is expressed as effective radiated power in decibels (dBm), however, other metrics could be employed.

In one embodiment of the present invention, when the data transmission state transitions to active (data-on) 65, the power level 67 is increased to allow the synchronization messages to be employed for phase reference as well. The base station, therefore, maintains target power levels for each of these data transmission states. One, a so-called active target power level corresponds to the data-on transmission state; another, a so-called idle target power level, corresponds to the data-off transmission state.

Figure 7:
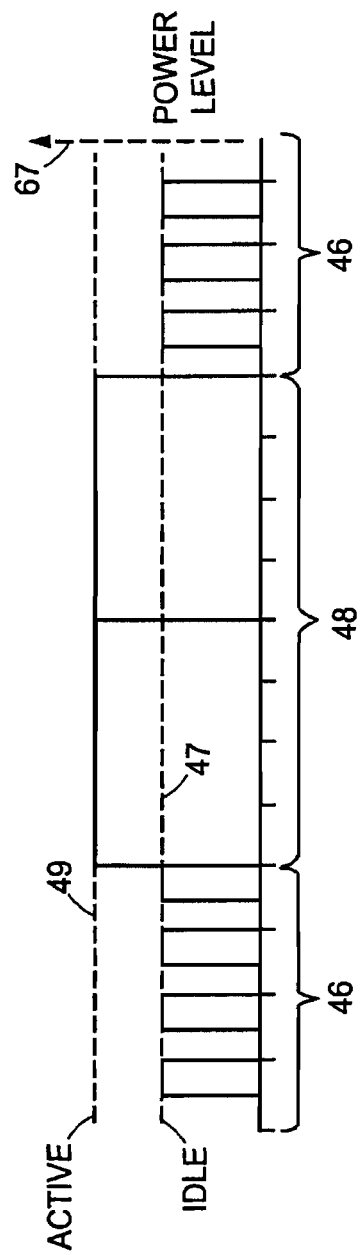
FIG. 7 shows idle and active power levels.

FIG. 7 shows this concept in more detail. Periods 46 correspond to data-off transmission state, and period 48 corresponds to data-on transmission state. The power level 67 indicates the power level of the synchronization messages. The idle target power level, shown by dotted line 47, indicates the power level at which synchronization messages should be sent during data-off transmission state. The active target power level, shown by dotted line 49, indicates the power level at which synchronization messages should be sent during data-on transmission state.

To accomplish this end result, the base station 20 manages the transmission power of the messages sent by the access terminal 24 by power control messages, which are sent by the base station 20 on the forward link 40 to adjust the idle and active target power levels 51, 52. The access terminal 24 then maintains the idle and active target power levels 51, 52. Specifically, the access terminal 24 determines when the data transmission state changes and toggles between the active and idle transmission power levels, and transmits according to the corresponding power level. The base station 20 determines a change in the data transmission state, described further below, and adjusts the power control messages accordingly.

While the data transmission state affects whether transmission occurs at the active or idle power level, other factors affect the perceived power level as well. The distance from the access terminal 24 to the base station 20, intervening objects, interference from other sources, and other factors all can affect the perceived power level of the wireless messages. Accordingly, the base station 20 examines the received signal quality, indicative of the power level of a received message, and computes the power control message accordingly. If a message from the access terminal 24 is being received at too low a perceived power level, the base station will transmit power control messages indicative of a higher power level at which to transmit. Similarly, if a message is received from the access terminal 24 at too high a perceived power level, the base station will transmit power control messages indicative of a lower power level at which to transmit. The base station, therefore, manages the power level of messages transmitted from the access terminal by focusing on a target power level.

Accordingly, when the access terminal 24 changes data transmission states, the base station will receive messages at a different power level. The base station determines that the change in power level is due to a change in data transmission state, and not to other factors described above, and continues to compute the idle and active power levels accordingly. The access terminal 24 may also disregard power control messages for a predetermined period after toggling data transmission states. The access terminal, therefore, may toggle between the active and idle power levels without the base station 20 countering with power control messages which would otherwise undermine the transmission of reduced power synchronization messages.

Referring also to FIG. 1 again, an access terminal 24 first determines if there is data ready to be transmitted on a reverse link traffic channel 52. A check is performed to set or maintain the data transmission state accordingly. If there is no data waiting to be transmitted, the access terminal 24 enters or maintains the data transmission state of idle. If there is data waiting to be transmitted, the access terminal 24 enters or maintains the data transmission state of active.

In the idle data transmission state, the access terminal sets 24 the transmission power level on the maintenance channel 53 at the idle target power level. The access terminal then determines the gating rate of the idle state message. In the idle mode, the message is sent in a gated, or periodic manner, such as ¼, 2, or 1, as described above. The gating rate results in a periodic delay, prior to sending the next synchronization message.

In the active data transmission state, the access terminal 24 sets the transmission power level at the active target power level. The access terminal then sets the message as continuous, with no gating.

The access terminal 24 then sends a synchronization message or signal to a base station 20. The base station 20 receives the synchronization message or signal, and determines the data transmission state.

A check is performed to examine the determined data transmission state. If the data transmission state is idle, then the base station computes or maintains a new idle target power level. If the data transmission state is active, then the base station computes a new active target power level. The base station 20 then sends a power control message indicative of the computed target power level to the access terminal 24.

The access terminal 24 receives the power control message, including the new target power level. The access terminal 24 then determines when to send the next synchronization message or signal, depending on gating rate and control reverts to the earlier step of determining if there is data ready to be transmitted on the traffic channel. In a gated manner, the access terminal 24 periodically sends the synchronization message or signal depending on the gating rate. Accordingly, the access terminal 24 may wait for one or more power control group intervals of 1.25 ms each to elapse before sending the next synchronization message or signal, as shown above in FIG. 3. Alternatively, in the active data transmission state, the synchronization messages or signals are sent in a continuous manner, also as shown in FIG. 2.

The base station 20 receives the synchronization message or signal from the access terminal 24. The base station determines which metric to employ to determine the data transmission state at the access terminal 24. As the access terminal toggles the data transmission state between active and idle, the base station determines the current data transmission state from the synchronization messages or signals as they are received. The base station 20 then attempts to set the target power level reflected in the power control messages accordingly.

The base station 20 examines the received quality level of the synchronization message or signal to determine the power level at which it was sent, and hence the data transmission state of either idle or active. As indicated above, the access terminal 24 transmits at one of the idle or active power levels depending on the data transmission state. However, the base station 20 attempts to adjust the target power level such that access terminal transmissions are received uniformly at the base station 20. Accordingly, the base station 20 determines a transmission quality based on a link quality metric. Since the received quality level may be affected by other factors in addition to transmission power employed by the access terminal 24, such as noise, interference, and reflection, other metrics may be used to assess received signal quality and determine the sending power level.

Alternatively, the base station may receive a separate data transmission state indication according to a periodic interval. Such a predetermined interval may be according to the gating rate, or according to a predetermined interval agreed to by the base station and the access terminal, as described below.

The base station 20 may also receive the data transmission state encapsulated in the synchronization message. A detectable signal encapsulated in the synchronization message is detected by the base station, and employed to set the data transmission state, and the associated target power control level, at the base station 20 accordingly. In another embodiment, the base station employs a physical layer state change to determine the data transmission state. The physical layer state change transitions are indicated by a signal in the synchronization message. The base station detects the physical layer state change, as described below, and sets the data transmission state accordingly.

In alternate embodiments, other methods may be employed to detect a change in data transmission state at the base station 20. The base station 20 therefore, determines the data transmission state from the synchronization message or signal, and sets its own indicator accordingly. The indicator is employed in determining the target power level to set in the power control message. Other factors which affect the target power level include the C/I (Carrier to Interference) ratio or the SNR (Signal-to-Noise ratio), in addition to the received power level. Once the target power level is determined, corresponding to a data transmission state of idle or active at the access terminal 24, control resumes at the earlier step of determining the data transmission state.

Figure 8:
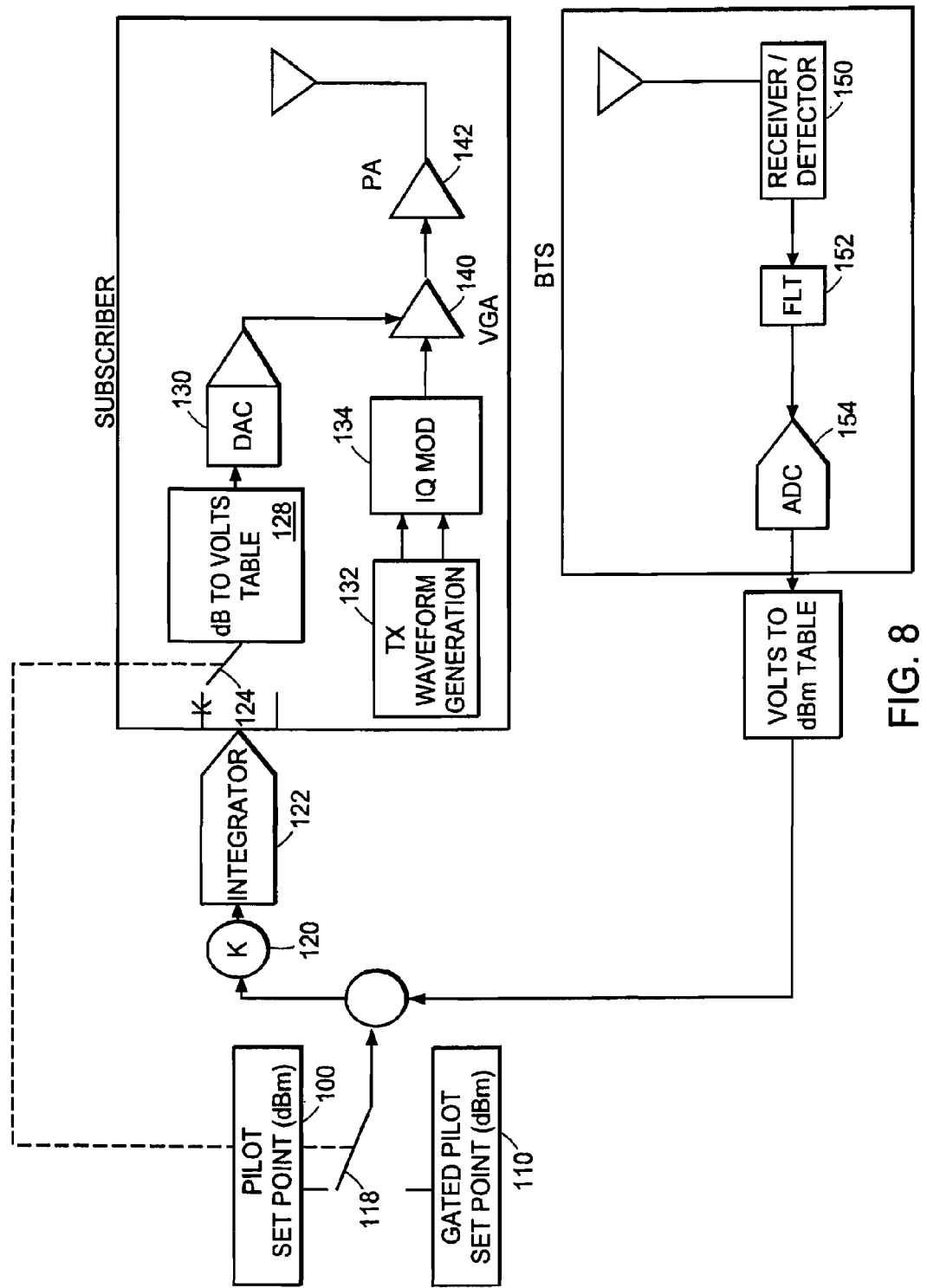
FIG. 8 illustrates a control loop implemented between the BTS and a field unit in order to maintain setpoints at two different levels.

FIG. 8 illustrates this power set point control loop implemented between the base station 20 and a field unit 24 in order to maintain power control setpoints at two different levels. In general, a different setpoint is associated with each of two different signaling types. For example, a first pilot setpoint 100 may be associated with pilot channel, a second gated pilot setpoint 110 may be associated with the gated pilot channel. The field unit 24 or base station 20 selects either the pilot set point 100 or the gated pilot set point 110 value depending upon the channel that the field unit 24 is presently transmitting. These values are provided by the BTS 20 to the field unit 24 or determined by the field unit 24 from parameters provided by the BTS 20. Prior to activating these channels, for example, pilot setpoint or gated pilot setpoint values may be provided from the BTS 20 to the field units on an access or paging channel prior to allowing the field unit 24 to enter an active mode, such as during call set-up. The values are derived by measurements taken by the BTS 20 through its antenna, receiver (detector) 150, filter 152, and A to D converter 154. The values provided by the A to D converter 154 are typically applied to a decibel with respect to millivolt (dBm) table which then results in a received power measurement. Other embodiments may use signal to noise (SNR) or carrier to interference (C/I) to control the reverse link power. The measurement is then compared to either of the two setpoints 110 or 100 depending on the mode the field unit 24 is to transmit. In one preferred embodiment (CDMA2000), the comparison is made in the base station 20. In another preferred embodiment (I-CDMA), the comparison is made in the field unit 24.

In one preferred embodiment (CDMA2000), the result of the comparison of the measurement of the with the set point is applied to the integrator 122 in the base station 20. In another preferred embodiment (I-CDMA), the result of the comparison of the measurement with the set point is applied to the integrator 122 in the field unit 24. Switches 118 and 124 associated with the path from the setpoint registers to the gain block 120 and from the integrator 122 to the dB to Volts table 128 are selected depending upon the particular active channel. If the switches 124 and 118 are switched simultaneously (both the base station 20 and the field unit 24 know there is a state change) then the integrator 122 is not effected by the increase or decrease in power level required to maintain the current transmission. The dB to Volts table 128 translates the integrated error signal maintained by the integrator 122 to a voltage value which can then be applied to the digital to analog converter 130. A transmit wave form associated with the signal that is to be applied to the respective pilot or gated pilot channel is then generated by the waveform generator 132. These signals are then provided to a complex in-phase (I) and quadrature (Q) modulator 134 and are provided as the signal input to a variable gain amplifier 140. The gain setting for the variable gain amplifier is then provided by the DAC 130. The resulting gain control signal is then fed to the output power amplifier 142 prior to being fed to the field unit antenna.

In this manner, it can be seen how different power level setpoints can be associated with different channels. For example, a setpoint value 100 or 110 can be each associated with a different channel type.

Figure 9:
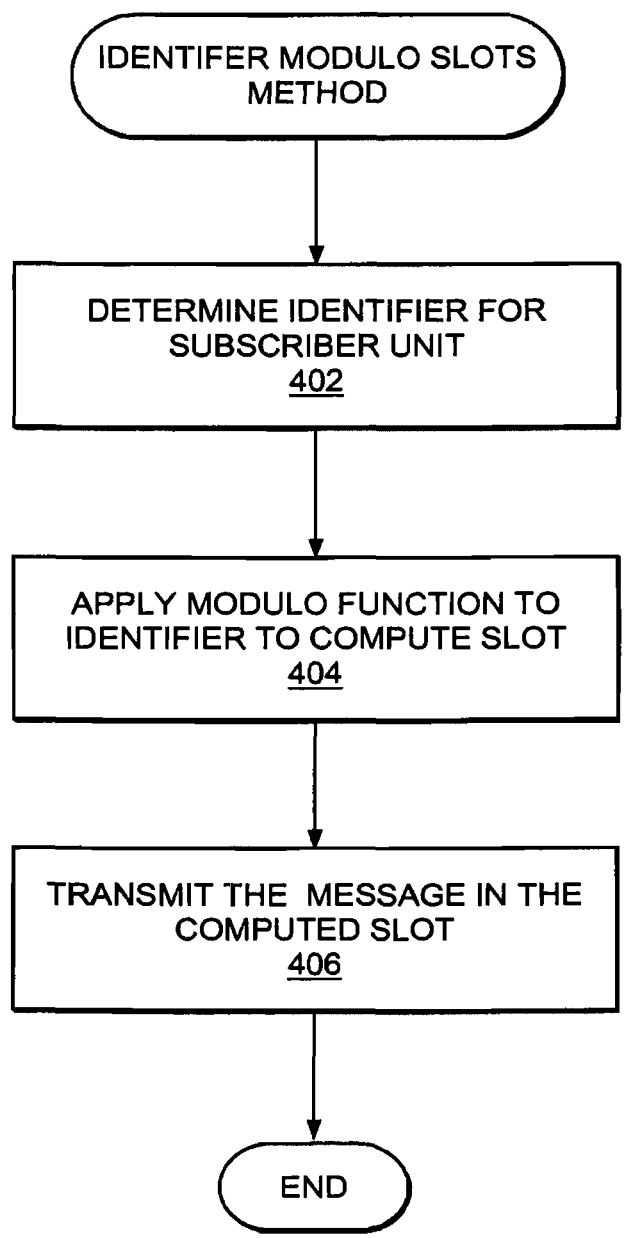
FIG. 9 is a flowchart of a method for maintaining an idling mode connection using a modulo function to assign slots.

FIG. 9 is a flowchart of a method for maintaining an idling mode connection using an identifier and modulo function to assign slots within code phases or frame offsets. Once the slot is assigned a field unit 24 can transmit signals on the reverse link. In system such as that described in the 1.times.EV DV proposal promulgated by 3GPP2, there are unique IDs for every active user utilizing the common packet data channel on the forward link. These are referred to as MAC_IDs.

One embodiment of the present invention employs the MAC_ID that is assigned to a field unit to "hash" the field units 24 (users) into specific time division multiplexed (TDM) slots on the reverse link during the control hold gated mode. The MAC_ID can be used to pick one of the available time slots which a user can use for gated operation or one of the available frame offsets. The BTS 20 can assign the MAC_IDs at the time the field connects to the BTS 20. They can be used through the communications session until the field disconnects. Since the BTS 20 is controlling all channel allocations, it has knowledge of time slot assignment etc.

Since all the MAC_IDs are different, the users will be distributed in a TDMA fashion, thereby reducing interference. Frame offsets can be used to manage backhaul loading of the voice circuits between the cell site and the PSTN. Frame offsets also have the effect of offsetting the gated on periods between some of the users such that they do not interfere. The present invention provides a decoupling of the frame offset from the determination of which field unit 24 is assigned to which slot.

Each field unit 24 is assigned a MAC_ID which is unique and deterministic of the field unit 24. By taking the MAC_ID and applying a modulo function to it then using the result as either a frame offset or a definition of which time periods are gated on and which are gated off, a TDM nature between field unit 24 users is ensured. The modulo is defined based on how many TDM slots, or frame offsets, are defined. The result of the modulo function may be employed for all transmissions, or for any of: idle (pilot transmissions), transmissions with overhead signaling, or for user data payload transmissions. A different modulo may be applied to different field units 24 depending on their gated rate. Typically, assignment of MAC_IDs is done with regard to the TDM effect on the reverse link. The MAC_IDs may be assigned in a linear fashion, or may be based on making the number of occupants in each slot equal, or by always assigning the next MAC_ID to result in an addition to the minimum occupied modulo state. The MAC_IDs may be periodically reassigned to minimize the peak number of users to TDM slots with fewer users.

For example, suppose a system with a gating of 4 (a rate of ¼) (as in CDMA2000) having 5 field units on the system. User 1 is assigned MAC_ID 1, which results in User 1 being assigned gated on periods (or frame offsets) defined by 1 Mod 4=1. Users 2, 3 and 4 get assigned MAC_IDs 2, 3 and 4, respectively. User 5 gets 5 mod 4=1, or the same frame offset as the first field unit 24. Thus, over time, the field units 24 are evenly distributed, as the number of free slots tends to be apportioned equally to all field units 24 competing for the free slots. A similar method can be used by a receiver portion of the base station 20 to determine which field unit 24 transmitted in which particular time slot.

As shown in the flowchart of FIG. 9, a method of maintaining an idling mode connection between a remote (mobile) or so-called field unit (SU) and a Base Transceiver Station (BTS) includes determining an identifier (e.g., MAC_ID) corresponding to a particular SU, as shown in Step 402. The identifier is unique and deterministic to that SU. A modulo function is applied to the identifier, in Step 404, and the result is employed in computing a frame offset or definition of which time periods are gated on and which are gated off (a slot) to ensure a time division multiplexed (TDM) nature between users of the shared channel when messages are sent, as described in Step 406.

Figure 10:
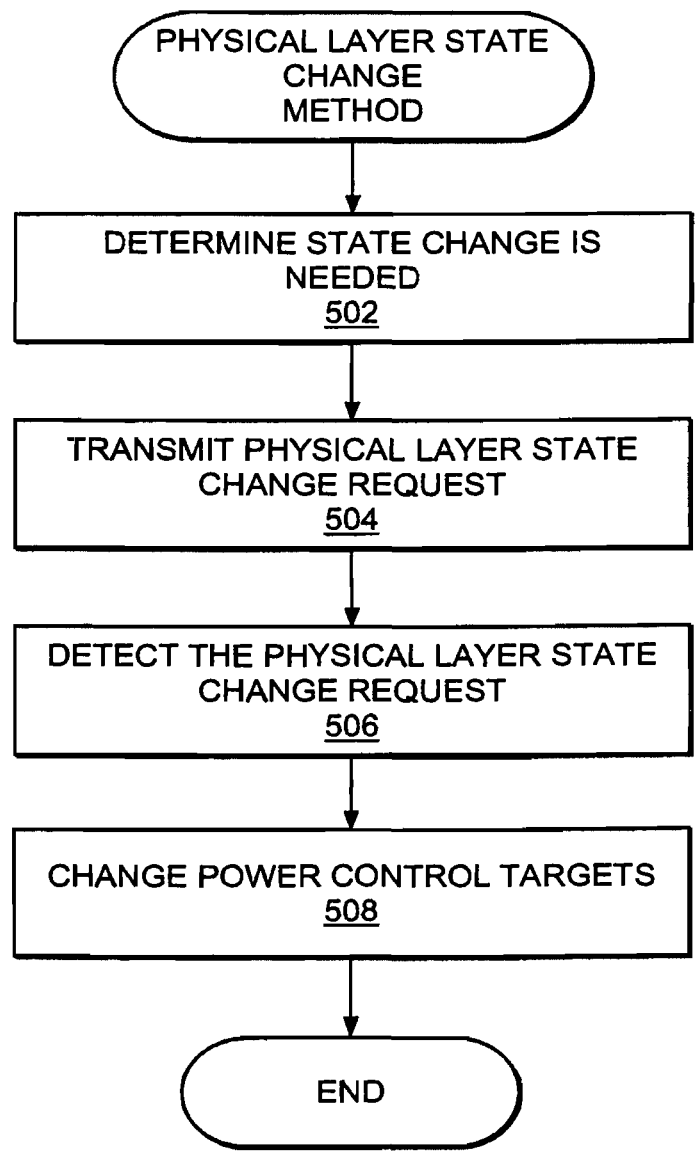
FIG. 10 is a flowchart of a method for maintaining an idling mode connection by requesting and detecting explicit state changes to adjust power level.

FIG. 10 is a flowchart of a method for maintaining an idling mode connection by requesting and detecting explicit state changes to adjust power level. The detection of a state change permits coordination of the power control targets to different levels depending on state. For example, it is desirable for the field unit 24 to transmit at a higher power level on the pilot channel when data, such as C/I bits (overhead) or user data payload, is present, as opposed to when no data is present. This can reduce interference between field units 24 on the reverse link when no data is being passed. Thus, rather than always detecting received data, then changing the power control targets at the BTS, the present invention first signals a physical layer state change, then changes the power control targets.

The signaling and detection of the state change may be done by any convenient method, including Layer 1 (L1) or Layer 2 (L2) signaling. As mentioned briefly above, certain wireless data systems have at least two major transmission states, active and idle. CDMA2000 has several MAC states on the reverse link, including: Active, Control Hold, and Dormant. The transitions from state to state are performed via certain signals defined by network standards. In the I CDMA system the states are: Active, Stand by, and Idle. These states are somewhat similar with the exception that transitions in CDMA may be performed with Layer 2 signaling (using messages), whereas in I-CDMA some of the transitions are requested via physical layer signaling (Layer 1), such as by sending a "heartbeat" or "heartbeat with request" at each maintenance channel timeslot.

In the embodiment show in FIG. 10, the state change to go active is explicitly signaled. This signaling may be done at the physical layer based as with the "heartbeat with request" signal, or other method (e.g., going from a gated to a non gated mode of the pilot signal as discussed above), or it may be sent as a modulated message (Layer 2).

In this case, the power control targets differ between the control hold and the active state. The targets are changed due to the presence or possible presence of data payload, but the data itself need not be detected. Only the indication of a state change is detected from the signaling, to indicate the change in power control targets. In this case it is likely no data will be sent in this new control hold state, and that upon state change, signaling and possibly payload data may be sent. Hence the power control target would be different in the BTS.

The preferred method of the present invention involves, as indicated in Step 502, determining that a state change is needed. Next, at Step 504, the field unit 24 transmits an indication for a request for a state change at the physical layer (e.g., heartbeat with request or gated to non gated pilot or other). At Step 506, this state change is detected, such as by detecting a physical layer indication. Upon changing state from a non payload or signaling bearing state to a payload or signal bearing state, as indicated in Step 508, the power control targets are changed in the BTS 20. An overhead request is detected to change state, and upon changing state from a non payload bearing state to a payload bearing state change the power control targets in the BTS 20.

The invention thus allows the power control set points maintained by the BTS 20 to change during gating periods such that the output power of the field unit 24 can be further reduced beyond that of just turning off traffic channels.

Figure 11:
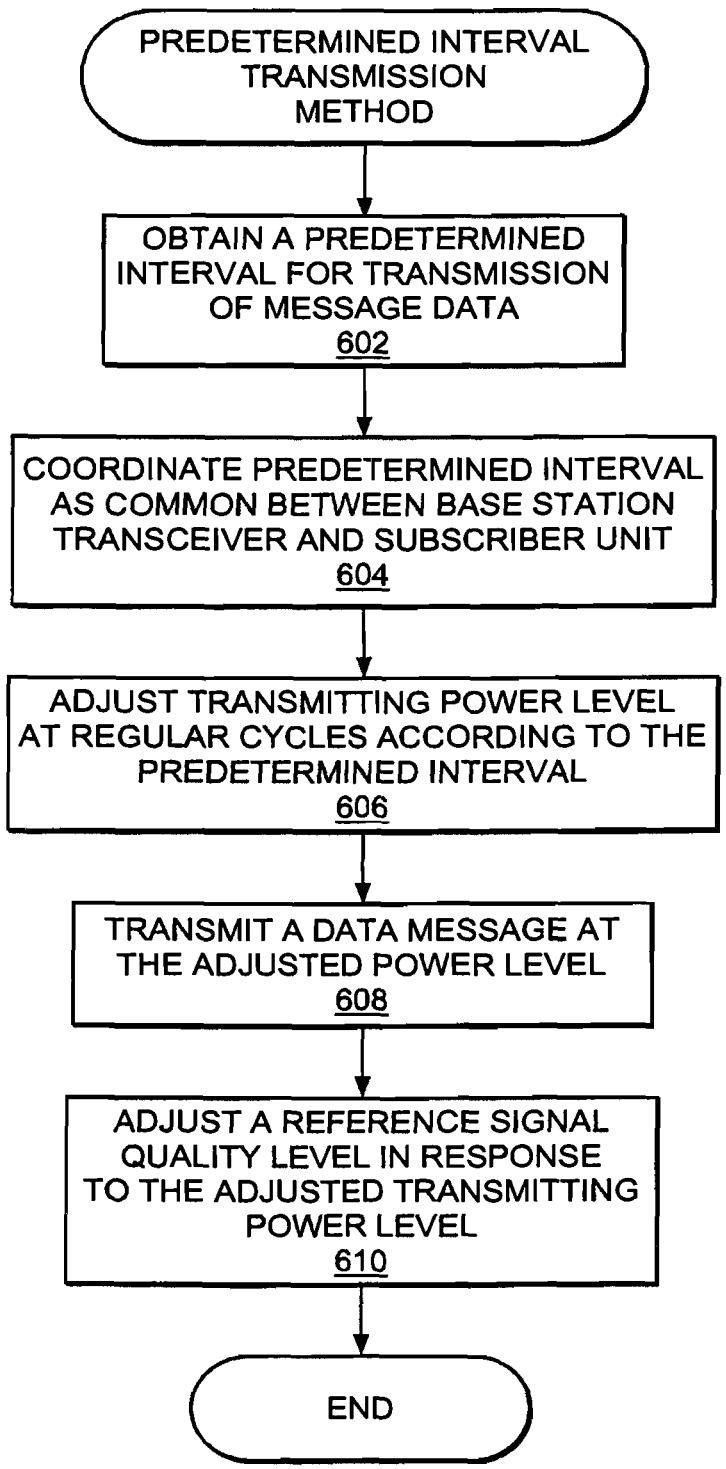
FIG. 11 is a flowchart of a method for maintaining an idling mode connection using predetermined intervals for transmitting maintenance data at adjusted power levels.

FIG. 11 is a flowchart of a method for maintaining an idling mode connection using predetermined intervals for transmitting maintenance data at adjusted power levels. As discussed above, in the proposed 1.times.EV DV system, there may be a case where some signaling is sent periodically while in the control hold state. This is defined as a periodic, and pre arranged sub state change. One such sub-state of the control hold mode, for example, involves transmission Carrier to Interference (C/I) information (or other signaling) that must be sent periodically sent at a fixed interval. This interval is slower than the power control and pilot transmission rate, but is known in advance. For example, one of every four pilot transmissions may be defined to include C/I information. In this case, it would be advantageous to automatically lower the pilot power during the other, non signaling, sub states.

As shown in the flowchart, in a first state 602 the predetermined interval for the sub-state change id obtained. Next, this interval is communicated to both field unit 24 and base station 20, as shown in Step 604. This can occur as a pre arranged, agreed and coordinated condition between the mobile and the BTS, or by exchanging messages. The BTS then changes its power control targets during the C/I on periods versus the non C/I periods and generate power control bits accordingly, as in Step 606. Messages can then be transmitted at the adjusted power level, as shown in Step 608. Additionally, a reference signal quality level can be adjusted in response to messages transmitted at the adjusted power level, as in Step 610.

All this method requires is some advance agreement that the step in power transmission between the signaling on and signaling off period is known by both the field unit and the BTS. In this way, field units 24 and BTS 20 can determine a dynamic target that is periodic and mutually agreed to. The field unit 24 will then automatically increase its pilot power transmission during the "on" periods by the step in the power control group, or periodic interval.

Such a periodic interval, accordingly, would occur during times when no overhead or user payload data is being transmitted. Periodic intervals would typically fall into increments of the power control group, such as 1 (none), 2, ¼, {fraction (1/16)}, etc., but could be any predetermined interval agreed to by the BTS 20 and the field unit 24. Coordination would typically be in the form of a message between the BTS and the field unit, such as encapsulated in the heartbeat signal, appended to the power control message, or as a separate message. Other mechanisms can be implemented by those skilled in the art, so as to maintain coordination between the BTS and the field units. Such a mechanism allows a predetermined cycle wherein the field unit transmits at an additional power level during the agreed upon predetermined interval, and the BTS increases the target power control level proportionately, according to a fixed step, during the interval, in order to maintain synchronization.

The power control targets for a specific reverse link channel type can be changed based on what the channel is currently being used for. If the reverse link pilot is being used for C/I signaling, the power can be increased, if it is just being used to maintain timing and power control with the BTS 20 the power can be decreased.

Parameters such as the predetermined sub-state interval can be controlled (Step 604) in several different ways. In CDMA2000, negotiation typically occurs at either call setup or during service optioning to determine how the BTS 20 and field unit 24 handle dynamic power control steps during gated periods, signaling periods, etc. Typically the field unit 24 sends the BTS 20 a list of capabilities, the BTS 20 compares it to what it is capable of, and sends the least common denominator back to the field unit 24. Other parameters are broadcast by the BTS on the sync and paging channels. The field units 24 use these parameters to determine how to interact with the BTS.

The embodiment described above includes two power control levels, of idle and active, as illustrative. However, multiple power level thresholds could be maintained between a field unit 24 and a base station 20. Accordingly, the invention as described herein may be employed to provide multiple levels of standby or idle status, depending on the level of signaling capability employed at each level, for the purpose of minimizing interference and maintaining synchronization between an access terminal 24 and a base station 20.

Those skilled in the art should readily appreciate that the system and methods for synchronization message power control as defined herein are deliverable to a wireless device in many forms, including but not limited to a) information permanently stored on non writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of transmitting a request signal using a first reverse link channel, the method comprising:
    establishing a connection with a wireless network utilizing an access channel;
    receiving by a field unit, assignment information and deriving a value associated with an offset from the assignment information;
    applying a modulo function to at least the value to compute a series of periodic time intervals, each time interval including at least one time slot in the first reverse link channel for transmitting a request signal; wherein the request signal indicates that the field unit is requesting to transmit packet data to a base transceiver station (BTS); and
    transmitting the request signal using the first reverse link channel to the BTS in the computed time interval; wherein the request signal is transmitted using the first reverse link channel on a condition that the connection is established and the field unit is not allocated a second reverse link channel to transmit packet data; wherein the first reverse link channel is not an access channel.

2. The method of claim 1, wherein a different modulo is applied to different field units.

3. The method of claim 1, wherein the computer time slot is one of the 128 slots defined by I-CDMA.

4. The method of claim 1, wherein the assignment information includes an identifier that is a medium access control layer identifier MAC_ID.

5. The method of claim 1, further comprising defining the modulo function based on how many time division multiplexed time intervals are defined.

6. The method of claim 1, wherein at least one other field unit applies a different modulo.

7. The method of claim 1, wherein the transmitted request signal is derived from at least a PN code.

8. The method of claim 1, wherein at least one other field unit transmits in a same time interval as the time interval computed to transmit the request signal.

9. A field unit for transmitting a request signal using a first reverse link channel, the field unit comprising:
a circuit configured to establish a connection with a wireless network utilizing an access channel;
the circuit is further configured to receive assignment information and to derive a value associated with an offset from the assignment information;
the circuit is further configured to apply a modulo function to at least the value to compute a series of periodic time intervals in the first reverse link channel for transmitting a request signal; wherein each time interval includes at least one time slot; wherein the request signal indicates that the field unit is requesting to transmit packet data to a base transceiver station (BTS); and
the circuit is further configured to transmit the request signal using the first reverse link channel to the BTS in the computed time interval; wherein the request signal is transmitted using the first reverse link channel on a condition that the connection is established and the field unit is not allocated a second reverse link channel to transmit packet data; wherein the first reverse link channel is not an access channel.

10. The field unit of claim 9, wherein at least one other field unit applies a different modulo.

11. The field unit of claim 9, wherein the transmitted request signal is derived from at least a PN code.

12. The field unit of claim 9, wherein at least one other field unit transmits in a same time interval as the time interval computed to transmit the request signal.

13. A base station for receiving a request signal using a first reverse link channel, the base station comprising:
a circuit configured to establish a connection with a field unit utilizing an access channel;
the circuit is further configured to transmit assignment information; wherein the assignment information is used by the field unit to derive a value associated with an offset from the assignment information;
the circuit is further configured to apply a modulo function to at least the value to compute a series of periodic time intervals in the first reverse link channel for receiving a request signal from the field unit; wherein each time interval includes at least one time slot; wherein the request signal indicates that the filed unit is requesting to transmit packet data to the base station; and
the circuit is further configured to receive the request signal using the first reverse link channel in the computed time interval; wherein the request signal is received using the first reverse link channel on a condition that the connection is established and the field unit is not allocated a second reverse link channel to transmit packet data; wherein the first reverse link channel is not an access channel.

14. The base station of claim 13, wherein the circuit is further configured to receive a request signal from at least one other field unit in a time interval derived using a different modulo.

15. The base station of claim 13, wherein the received request signal was derived from at least a PN code.

16. The base station of claim 13, wherein the circuit is further configured to receive a request signal from at least one other field unit in a same time interval as the time interval computed to receive the request signal from the field unit.

* * * * *